No. 894,623. PATENTED JULY 28, 1908.
H. GEISENHÖNER.
APPARATUS FOR MOLDING PORCELAIN WARE.
APPLICATION FILED JULY 25, 1904.

4 SHEETS—SHEET 1.

Witnesses:
George A. Thornton
Helen Orford

Inventor:
Henry Geisenhöner,
by Albert G. Davis
Atty.

No. 894,623. PATENTED JULY 28, 1908.
H. GEISENHÖNER.
APPARATUS FOR MOLDING PORCELAIN WARE.
APPLICATION FILED JULY 25, 1904.
4 SHEETS—SHEET 2.
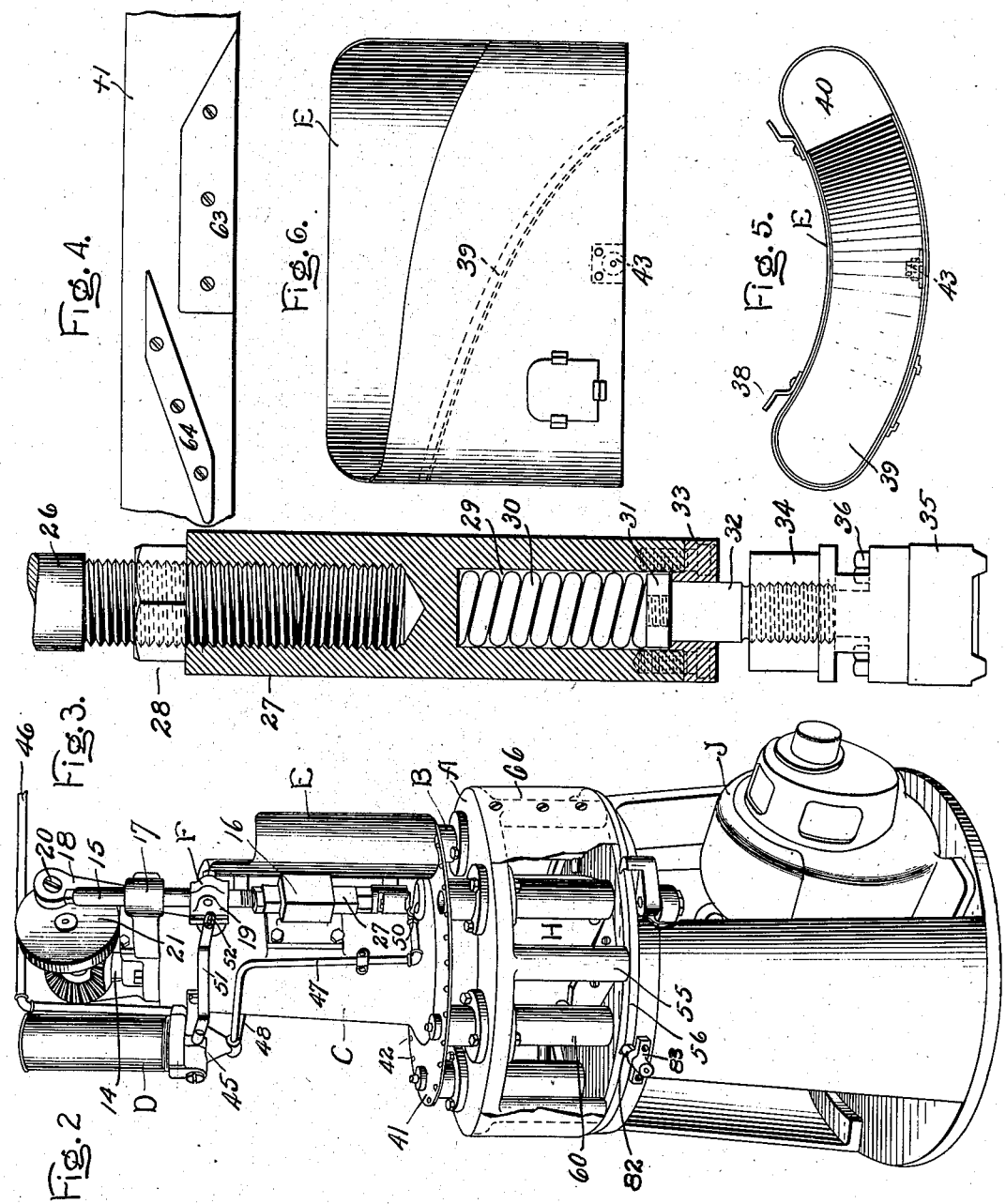
Witnesses:
George A. Thornton
Helen Oxford
Inventor:
Henry Geisenhöner,
by Albert G. Davis
Atty.

No. 894,623. PATENTED JULY 28, 1908.
H. GEISENHÖNER.
APPARATUS FOR MOLDING PORCELAIN WARE.
APPLICATION FILED JULY 25, 1904.

4 SHEETS—SHEET 3.

Witnesses:
George A. Thornton.
Helen Oxford

Inventor:
Henry Geisenhöner,
by Albert S. Davis
Atty.

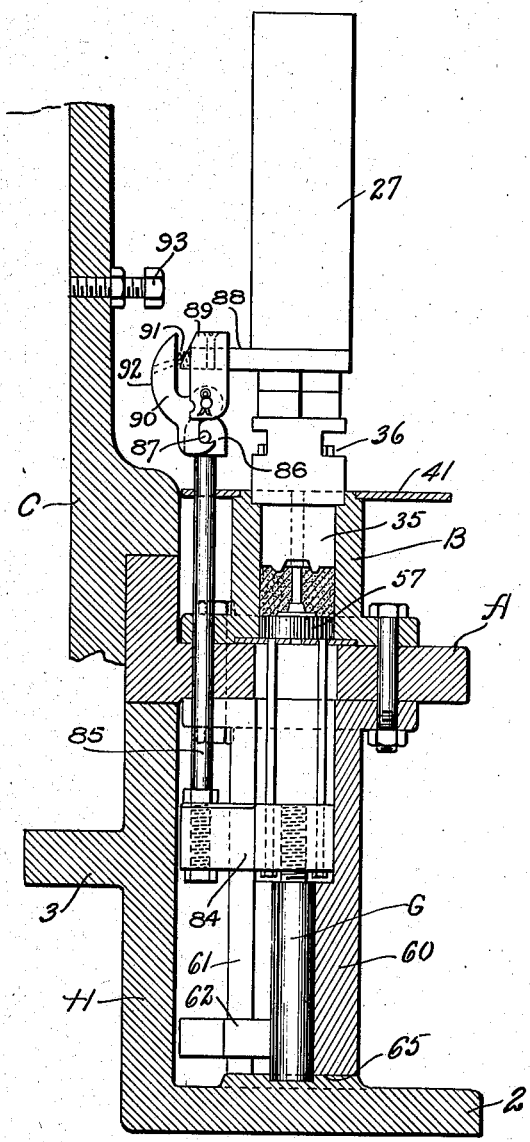

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

APPARATUS FOR MOLDING PORCELAIN-WARE.

No. 894,623.          Specification of Letters Patent.          Patented July 28, 1908.

Application filed July 25, 1904. Serial No. 218,096.

*To all whom it may concern:*

Be it known that I, HENRY GEISENHÖNER, a citizen of the United States, residing at Schenectady, in the county of Schenectady, State of New York, have invented certain new and useful Improvements in Apparatus for Molding Porcelain-Ware, of which the following is a specification.

The present invention relates to the art of manufacturing porcelain and analogous ware, and more particularly to the apparatus for molding and compressing the clay or other substance into the desired forms with the necessary degree of compactness.

Heretofore the apparatus almost universally employed in molding and compressing clay or other material into the desired shapes has consisted of a simple press provided with a mold or female die and a relatively-movable male die, and in the use of which all the operations of supplying the mold with the material to be operated upon, actuation of the press, removal of the product, and cleaning and oiling of the dies, have been performed by hand. As a consequence of this large number of manual operations, the manufacture of molded porcelain has been slow and correspondingly expensive.

Numerous attempts have been made at various times to provide automatic means for carrying out the several operations without attention on the part of the operator, but on account of their generally unsatisfactory performance and their great cost, they have not been used to any considerable extent.

The object of my invention is to provide an apparatus for molding porcelain and analogous ware which shall successfully perform automatically the operations of delivering the material operated upon to the molds, compressing it to the proper degree therein, ejecting the product from the molds and cleaning and oiling the dies preparatory to refilling.

Figure 1:
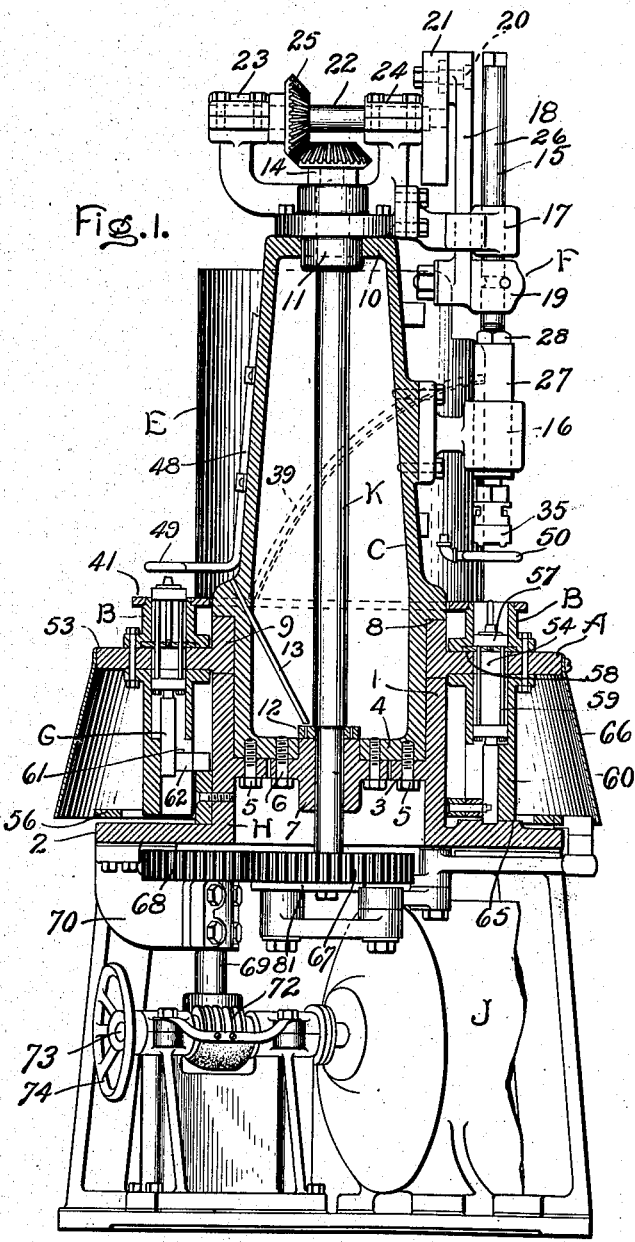
Figure 7:
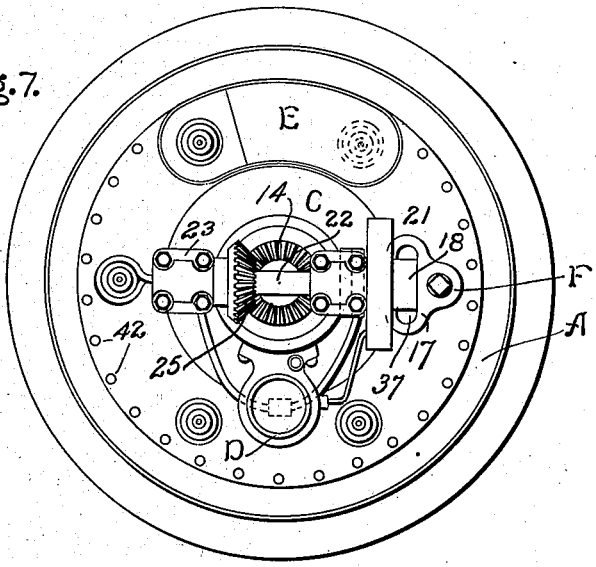
Figure 8:
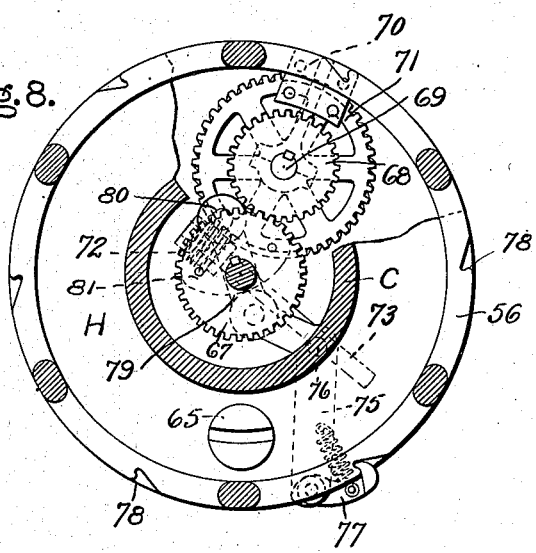

The invention will be readily understood by reference to the following description and the accompanying drawings forming a part of this specification, in which Figure 1 is a front sectional elevation of a molding machine embodying one form of my invention; Fig. 2 is a perspective view of the machine to the right of the elevation shown in Fig. 1; Fig. 3 is a sectional detail of the compressor plunger; Fig. 4 is a development of the cams for actuating the movable section of the female dies to eject the product; Figs. 5 and 6 are a plan and elevation of the hopper; Fig. 7 is a top plan of the apparatus; Fig. 8 is a broken plan section at the lower end of the base showing the gear and table operating arrangements; and Fig. 9 is a sectional detail showing the means for temporarily locking the male and female members of the mold together.

The apparatus shown in the drawings comprises a circular table A upon which are mounted a series of molds B and which is adapted to be rotated step-by-step about a central supporting column C upon which are mounted an oil reservoir D and compressed air connections for cleaning and oiling the dies, a hopper E for holding the material operated upon and delivering it to the molds, and a compressing means F provided with a reciprocating male die, the operations of which are so timed with relation to the successive movements of the table that it descends upon the material within a mold, compresses it and retracts therefrom while the table is at rest. The molds B are each provided with a movable bottom connected to an ejecting plunger G arranged to coöperate with cams or inclines secured to the cylindrical sides of the base H in such positions that the plunger is caused to rise succeeding the compression of the material in the mold to eject the completed product therefrom. The base H, which constitutes the lower member of the central support, is provided with a radial flange and supported on conical segments or legs from a floor plate, and in the space between the bottom of the base and floor plate an electric motor J is arranged and operatively geared to a vertical drive-shaft K by means of which motion is communicated to the several operating parts.

The base H comprises a cylindrical body part 1, and a circular flange 2 projecting outwardly from the lower end thereof, and an internal shoulder 3 provided with bolt holes. The supporting column C is provided with a cylindrical lower end which fits tightly in the cylindrical body part 1 of the base, and has at its end an internal flange 4 which is connected by bolts 5 to the shoulder 3, and by bolts 6 to a concentric bearing block 7 for the main shaft K. The cylindrical section of the supporting column extends somewhat above the upper end of the body part 1 of the base to a shoulder 8 formed thereon, whereby a bearing for the hub 9 of the table A is provided. The upper end of the column C is provided with an internal flange 10 upon which a concentric bearing block 11 for the upper end of the shaft K is bolted. The shaft K is provided near its lower end with a thrust collar 12 which bears upon the upper end of the bearing block 7, and to which oil is conducted by a tube 13 from the outside of the column, and at its upper end the shaft has fixed thereto a bevel gear 14 by means of which motion is communicated to the compressing means F.

The compressing means comprises a reciprocating plunger 15 guided for free vertical reciprocation in bearing blocks 16 and 17 secured respectively to the side of the column C and to the bearing block 11, and actuated by a link 18 pivoted at one end to a pivot block 19 carried by the plunger 15, and at the other to a crank pin 20 carried by a disk 21 secured to a shaft 22 which is journaled in bearings 23 and 24 at the ends of arms projecting from opposite sides of the bearing block 11, and provided with a bevel gear 25 meshing with gear 14. The plunger 15 comprises an upper cylindrical section 26 and a lower polygonal section 27 secured by screw-threads and a lock-nut 28, whereby the lower section may be adjusted toward or from the molds. The lower section 27 is provided with a cylindrical cavity 29, in which is located a stiff helical spring 30 which thrusts against the head 31 of a short polygonal bolt 32, which is capable of vertical movement in a polygonal guide box 33 secured to the bottom of the section 27. The bolt 32 is screw-threaded at its lower end into a head 34 to which the male die 35 is detachably connected by set-screws 36. This spring connection between plunger and die provides for a certain flexibility of parts whereby the material operated upon is compressed to a substantially uniform degree, even though its amount and quality as delivered to the mold may vary.

The lower bearing block 16 for the reciprocating plunger is provided with polygonal bearing surfaces corresponding to the polygonal section 27, and the upper bearing block 17 is provided with a slotted intermediate portion 37 for the passage of the link 18 therethrough.

The hopper E is made of sheet iron with concentric cylindrical side walls and rounded ends, as shown in Figs. 5 and 6, and is connected to the side of the supporting column C by flexible brackets 38.

The bottom of the hopper consists of an inclined plate 39 secured to its side walls and extends diagonally to the plane of the lower end thereof, and intersecting therewith at a point somewhat removed from the leading end of the hopper, so that an opening 40, as large or larger than the mouth of a mold, is provided for the free passage of the clay when a mold is presented therebeneath. In order to prevent the escape of the clay from the hopper, when the opening 40 is not alined with a mold, a circular retaining plate 41, having holes formed therein to fit about the upper end of the molds, is secured to the table A with its upper surface in the plane of the tops of the molds B, so that it may rotate in immediate contact with the lower end of the hopper and the clay in the opening 40. To prevent the mass of clay from arching in the hopper, the latter is caused to vibrate slightly by providing small elevations 42 in the surface of the plate 41 and the hopper with a roll 43 arranged in the path of the elevations, so that as each elevation 42 passes therebeneath the hopper is flexed upwardly and allowed to drop back.

The means for cleaning the dies and applying air thereto comprises a closed oil reservoir mounted upon the side of the supporting column C and connected at its lower end to a suitable valve 45, to one end of which is connected a pipe 46 connected to some suitable air compressor (not shown), and at the other end to two delivery pipes 47 and 48 leading down on opposite sides of the column C, and provided at their ends with spraying nozzles 49 and 50, one of which is arranged to deliver the oil and air to the under surface of the male die 35, and the other to deliver the mixture to the upper surface of the female die. The valve 45 is automatically opened and closed by a crank 51 fixed to the valve spindle at one end, and connected at the other end by a pin and slot arrangement 52 to the pivot block 19 of the compressing means.

The table A comprises a hub 9 journaled upon the cylindrical lower end of the column C between the shoulder 8 and the upper end of the cylindrical part 1 of the base H, a radial flange 53 integral with the hub 9 and provided with a series of vertical apertures 54 and posts 55, to the lower ends of which a ratchet ring 56 is secured in position just above the upper surface of the flange 2 of the base. The molds B are detachably secured to the upper surface of the table about the apertures 54, and are provided with movable members 57, which normally rest upon a step-plate 58 provided with apertures for the passage of rods 59, which connect the movable members 57 to the respective ejecting plungers G.

The plungers G are carried in vertical guide blocks 60 secured to the underside of the table in line with the apertures 54 and provided with side slots 61, through which roller pins 62 connected to the plungers G project into the path of the cams 63 and 64 supported on the cylindrical surface of the base H. The lower ends of the vertical guide blocks 60 are turned off square to engage and rest upon a shouldered surface 65 formed on the top side of the flange of the base H for a short space on the side of the machine at which the compressing operation is performed. A petticoat or shield 66 of sheet metal is secured to the outer periphery of the table A to protect the operative parts beneath it from particles of clay.

The main drive-shaft K receives motion through a spur gear 67 fast upon its lower end, and meshing with a corresponding gear 68 fast upon a short shaft 69 journaled in a bracket 70 depending from the bottom of the base H, and provided at its lower end with a worm wheel 71 which is driven by a worm 72 on the shaft 73 of the motor J. A hand wheel 74 is fastened to the outer end of the shaft 73 to enable the apparatus to be worked by hand when setting up or cleaning.

The means for rotating the table A step-by-step comprises a bell crank lever 75 pivoted at 76 to the underside of the base H, and carrying at its outer end a spring-pressed pawl or hook 77 adapted to engage the teeth 78 of the ratchet ring 56. The inner end of the lever 75 pivotally engages one end of a link 79, which is connected at its other end to a crank pin 80 carried in a plate 81 secured to the lower side of the gear 67.

As will appear on inspection, the lever 75 is arranged to be actuated once for each revolution of the drive-shaft K, and the compressing means F is also arranged to make a complete reciprocation for each revolution of the drive-shaft, so that for each operation of compression there will be a corresponding movement of the table A. The parts are arranged, however, so that the table is caused to rotate while the male die is in its uppermost position and remains stationary while the male die is in operative relation to the molds.

In order to lock the table in exact position after each partial revolution, a spring-pressed bolt 82 having a pointed nose adapted to enter the recess at the ratchet teeth 78, is supported in a bracket 83 secured to the side of the base H in the plane of the ratchet ring 56.

In order to lock the male and female members 35 and 57 of the molds together until the molded porcelain bat is out of the mold cavity and thereby prevent the formation of cracks and air holes in the porcelain, I connect to the blocks 84 at the upper ends of plungers G upright rods 85 having at their upper ends heads 86 carrying transverse pins 87, and to the lower ends of the polygonal sections 27 of the plungers 15 I provide arms 88, upon the rear ends of which are clamped pivot blocks 89 carrying latches 90 normally pressed into engaging positions by springs 91. The lower ends of the latches are arranged to snap over pins 87 and their upper ends have cam faces 92 arranged to engage suitably arranged stops 93 carried by the frame of the machine, so that by the time the molded porcelain bat has been raised to the surface of the disk 41 the male member 35 is permitted to separate therefrom.

I do not desire to restrict myself to the particular embodiment or construction of parts herein shown and described, since it is apparent that many changes may be made without departing from my invention.

What I claim as new and desire to secure by Letters Patent of the United States, is—

1. In an apparatus of the class described, the combination of a central support, a table provided with a series of molds and mounted to rotate about said central support, compressing means mounted upon said support and adapted to coöperate successively with the said molds, and a drive-shaft journaled concentrically of said support and having at its upper end gear connection with a counter-shaft for actuating said compressing means and at its lower end a crank connection with pawl and ratchet means for intermittently actuating said table.

2. In an apparatus of the class described, the combination of a support, a table mounted to rotate on said support and provided with a series of molds having movable bottoms, a reciprocating device for compressing the material operated upon into said molds, means for reciprocating said movable bottoms of the molds, spraying devices located in the respective paths of the molds and compressing device, and means for intermittently delivering air under pressure to said spraying devices to remove particles adhering to said mold bottoms and reciprocating device when in retracted position.

3. In an apparatus of the class described, the combination of a movable table provided with a series of molds, a reciprocating device for compressing the material operated upon into said molds successively, an oil reservoir under fluid pressure, spraying devices connected thereto and located in the paths of said reciprocating device and said molds, and a valve for controlling the flow of oil and pressure fluid connected to be intermittently operated by said reciprocating device.

4. In an apparatus of the class described, the combination of a rotary table provided with a series of molds, a surfaced part supported in the plane of the ends of said molds and provided with a series of elevations, and a hopper for the material operated upon having its delivery end supported in proximity to said surfaced part and adapted to engage said elevations during the rotation of said table.

5. In an apparatus of the class described, the combination of a mold, a reciprocating plunger adapted to coöperate therewith, an ejector carried by the mold, and means for connecting the plunger and ejector whereby the product is held in engagement with the former while being ejected.

6. In an apparatus of the class described, the combination of a series of molds, a yieldable reciprocating plunger adapted to coöperate successively therewith, an ejector carried by each mold, and means for connecting said ejectors with said plunger whereby upon the return stroke of the latter the product is held in contact therewith while being removed from the mold.

In witness whereof, I have hereunto set my hand this 22nd day of July, 1904.

HENRY GEISENHÖNER.

Witnesses:
BENJAMIN B. HULL,
HELEN ORFORD.